(12) United States Patent
Imtiaz et al.

(10) Patent No.: US 12,189,487 B2
(45) Date of Patent: Jan. 7, 2025

(54) OPTIMIZING DEDUPLICATION HIT-RATE IN A REMOTE COPY ENVIRONMENT

(71) Applicant: INTERNATIONAL BUSINESS MACHINES CORPORATION, Armonk, NY (US)

(72) Inventors: Imran Imtiaz, Manchester (GB); Anuj Chandra, Pune (IN); Miles Mulholland, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/188,528

(22) Filed: Mar. 23, 2023

(65) Prior Publication Data

US 2024/0256390 A1    Aug. 1, 2024

(30) Foreign Application Priority Data

Feb. 1, 2023   (GB) ..................................... 2301454

(51) Int. Cl.
  *G06F 11/14* (2006.01)
  *G06F 21/60* (2013.01)
(52) U.S. Cl.
  CPC ........ *G06F 11/1453* (2013.01); *G06F 21/602* (2013.01); *G06F 2201/84* (2013.01)
(58) Field of Classification Search
  CPC .. G06F 11/1453; G06F 16/27; G06F 12/1408; G06F 3/0641; G06F 3/0608
  See application file for complete search history.

(56) References Cited

U.S. PATENT DOCUMENTS

| | | | |
|---|---|---|---|
| 8,099,571 B1 | 1/2012 | Driscoll |
| 8,214,428 B1 | 7/2012 | Christiaens |
| 8,788,769 B2 | 7/2014 | Abercrombie |
| 9,110,914 B1 | 8/2015 | Frank |
| 9,251,198 B2 | 2/2016 | Mutalik |
| 9,372,866 B2 | 6/2016 | Provenzano |
| 9,436,558 B1 | 9/2016 | Per |
| 9,563,683 B2 | 2/2017 | Abercrombie |
| 9,679,040 B1 | 6/2017 | Davis |
| 9,832,260 B2 | 11/2017 | Bare, II |

(Continued)

OTHER PUBLICATIONS

UK Examination Report for Application GB2301454.1 dated Jul. 12, 2023, 3 pages.

*Primary Examiner* — Hau H Hoang
(74) *Attorney, Agent, or Firm* — Jared C. Chaney

(57) ABSTRACT

A method, system, computer program product and computer program for managing a storage system, comprising a primary system and a backup system, wherein the backup system is in a copy relationship with the primary system, comprising: in response to a write operation, the write operation comprising first data: calculating a cryptographic value for the first data; scanning a first directory to identify an entry corresponding to the cryptographic value to determine a first set of addresses associated with the write operation; transmitting the first set of addresses to the backup system; and updating the first directory with a first entry for the write operation, the first entry comprising a pointer to the first set of addresses; updating a second directory with a second entry for the write operation, the second entry comprising a pointer to a second set of addresses corresponding to the first set of addresses.

20 Claims, 8 Drawing Sheets

(56) References Cited

U.S. PATENT DOCUMENTS

2020/0159414 A1* 5/2020 Hu .................... G06F 16/9014
2020/0334210 A1 10/2020 Vijayan
2021/0157771 A1 5/2021 Simha
2021/0342297 A1 11/2021 Gupta
2024/0028240 A1* 1/2024 Shani .................... G06F 3/0613

* cited by examiner

| PARTIAL # VALUE | VOLUME | VIRTUAL ADDRESS | SLOT INDEX |
|---|---|---|---|
| ABCD0123 | VOL_n | x | S_X |
| EFGH0456 | VOL_m | z | S_Z |
| ... | ... | ... | ... |
| ... | | | |

FIG. 5

OPTIMIZING DEDUPLICATION HIT-RATE IN A REMOTE COPY ENVIRONMENT

BACKGROUND

Aspects of the present disclosure relate to storage. In particular it provides a method, system, and computer program product suitable for managing a storage copy relationship.

Thin provisioning is a concept where storage does not wholly allocate the advertised capacity. Storage is only allocated when it must be used. Both block and file systems have equivalents of this: file systems are effectively thin provisioned by their nature (files can only be allocated upon creation), and block storage systems can have thin provisioning implemented using a forward lookup structure to map allocated ranges to the physical storage medium. Storage can either be kept local to a volume, or pooled between multiple volumes. Thin provisioning allows the implementation of advanced space saving techniques, such as compression and deduplication as one need only update the forward lookup structure with the appropriate details, for example if the forward lookup structure is compressed, or pointing the forward lookup structure for a virtual address to another forward lookup structure entry containing the data in question. A thin-provisioned storage volume presents a different capacity to mapped hosts than the capacity that the storage volume consumes in a storage pool.

Data deduplication is a method that minimizes redundant copies of data and reduces storage overhead. Methods make sure that only one version of data is retained on a storage system. Redundant data is replaced with a pointer to the unique version. An example is in an email system where multiple emails attach the same document. Rather than the system storing multiple copies of the document, metadata for each of the multiple emails contains a pointer to a single copy of the document.

Deduplication methods can be based on hashing the data written to identify matches to data ranges previously written by matching the hash value to that stored in metadata. Commonly the hashes are stored in the form of a log structured array (LSA). Rather than consuming more media on the storage device by performing a write to the media the device's metadata can be updated to increase the reference count for the data hash and achieve deduplication space savings.

A hash value is a cryptographic value. Hashing is a programming method in which a string of data is transformed into a smaller, fixed size data value, known as 'key' or a 'hash value'. Hashing is often used to index data, because finding a hash value is quicker than finding the string of data. A 'hash function' is an algorithm that creates the hash value from the string of data. Hash functions are one-way in that the string of data cannot be discovered from the hash value. Hash functions generally create a unique hash value. Hash functions used for storage systems have an extremely low likelihood of hash collisions, leading to an assumption that hash values will be different for different data.

Common hash functions are MD5 and SHA1. No matter how large the string of data is, the hash function produces a hash value of the same size. MD5 produces a hash value with a 128 bit size, and SHA1 produces a hash value with a 160 bit size (20 bytes). For example 8f6b22b052930898dc96f3aac7cbc54fd6530590.

BRIEF SUMMARY

According to the present disclosure there are provided a method, a system, and a computer program product according to the independent claims.

Viewed from a first aspect, the present disclosure provides a computer implemented method for managing a storage system, the storage system comprising a primary system and a backup system, wherein the backup system is in a copy relationship with the primary system, the method comprising: in response to a write I/O operation, the write I/O operation comprising first data: at the primary system: calculating a first cryptographic value for the first data; scanning a first directory to identify an entry corresponding to the first cryptographic value to determine a first set of addresses associated with the write I/O operation; transmitting the first set of addresses to the backup system; and updating the first directory with a first entry for the write I/O operation, the first entry comprising a pointer to the first set of addresses; at the backup system: updating a second directory with a second entry for the write I/O operation, the second entry comprising a pointer to a second set of addresses corresponding to the first set of addresses.

Viewed from a further aspect, the present disclosure provides a system for managing a storage system, the storage system comprising a primary system and a backup system, wherein the backup system is in a copy relationship with the primary system, the system comprising: responsive to a write I/O operation, the write I/O operation comprising first data: at the primary system: a first cryptographic component for calculating a first cryptographic value for the first data; a lookup component for scanning a first directory to identify an entry corresponding to the first cryptographic value to determine a first set of addresses associated with the write I/O operation; a first send/receive component for transmitting the first set of addresses to the backup system; and a first lookup management component for updating the first directory with a first entry for the write I/O operation, the first entry comprising a pointer to the first set of addresses; at the backup system: a second lookup management component for updating a second directory with a second entry for the write I/O operation, the second entry comprising a pointer to a second set of addresses corresponding to the first set of addresses.

Viewed from a further aspect, the present disclosure provides a computer program product for for managing a storage system, the storage system comprising a primary system and a backup system, wherein the backup system is in a copy relationship with the primary system, the computer program product comprising a computer readable storage medium readable by a processing circuit and storing instructions for execution by the processing circuit for performing a method for performing the steps of the disclosure.

Viewed from a further aspect, the present disclosure provides a computer program stored on a computer readable medium and loadable into the internal memory of a digital computer, comprising software code portions, when said program is run on a computer, for performing the steps of the disclosure.

In some embodiments, the present disclosure provides a method, system, computer program product and computer program, further comprising: wherein scanning the first directory to identify the entry corresponding to the cryptographic value to determine the first set of addresses associated with the write I/O operation comprises: scanning a first fingerprint lookup structure to identify the cryptographic value for the data to determine a first virtual address of the set of addresses; and identifying the second entry for the first virtual address in a first forward lookup structure, the second entry identifying a first physical address of the set of addresses, wherein the first physical address comprises the first data; wherein updating the first directory comprises updating the first forward lookup structure with the first entry and updating the first fingerprint lookup structure; and wherein updating the second directory comprises updating a second forward lookup structure with the second entry and updating a second fingerprint lookup structure.

In some embodiments, the present disclosure provides a method, system, computer program product and computer program, wherein scanning the first fingerprint lookup structure to identify the first cryptographic value comprises scanning the first fingerprint lookup structure to identify a partial cryptographic value of the first cryptographic value.

In some embodiments, the present disclosure provides a method, system, computer program product and computer program, wherein the first cryptographic value is a hash value.

In some embodiments, the present disclosure provides a method, system, computer program product and computer program, wherein the method further comprises: at the primary system: reading second data from a first physical address of the first set of addresses; calculating a second cryptographic value for the second data; and in response to the first cryptographic value being equal with the second cryptographic value, signaling a successful write I/O operation at the primary system.

In some embodiments, the present disclosure provides a method, system, computer program product and computer program, further comprising: at the backup system: reading third data from a second physical address of the second set of addresses; calculating a third cryptographic value for the third data; and in response to the first cryptographic value being equal with the third cryptographic value, signaling a successful write I/O operation to the primary system.

In some embodiments, the present disclosure provides a method, system, computer program product and computer program, wherein the method further comprises translating the first set of addresses into the second set of addresses.

In some embodiments, the present disclosure provides a method, system, computer program product and computer program, wherein the write I/O operation further comprises a second virtual address, and updating the first directory with the first entry comprises updating the first directory at a location corresponding to the second virtual address.

In some embodiments, the present disclosure provides a method, system, computer program product and computer program, wherein updating the first fingerprint lookup structure comprises updating a reference count for the cryptographic value.

In some embodiments, the present disclosure provides a method, system, computer program product and computer program, wherein the first entry and the second entry comprises deduplication entries.

In some embodiments, the present disclosure provides a method, system, computer program product and computer program, wherein the copy relationship is a synchronous copy relationship.

In some embodiments, the present disclosure provides a method, system, computer program product and computer program, wherein the copy relationship is an asynchronous copy relationship.

In some embodiments, the present disclosure provides a method, system, computer program product and computer program, the method further comprising: preparing a change volume associated with a set of write I/O operations to the primary system; determining a first set of volumes in the primary system having deduplication references to a second set of volumes in the backup system; prior to sending a change volume associated with a set of write I/O operations, sending a further set of addresses associated with the second set of volumes to the backup system; and at the backup system, at the backup system, updating the second forward lookup structure with a set of second entries associated with the further set of addresses, and prepopulating the second fingerprint lookup structure with a set of third entries.

In some embodiments, if there is a remote copy partnership, where two clusters are leveraging deduplication, the deduplication hit rate at the remote site can be optimized by noting which volumes fresh writes are deduplicated against on the local site. If the volumes the data is deduplicated against are synchronized to the remote site, the volume and address can be sent prior to the data, allowing the remote site to get a hint towards deduplication that can be used to pre-populate a deduplication fingerprint database. This allows a less-capable Backup system to leverage the findings of the Primary system when performing space optimization.

The approach has the benefit that there is less dependency on a scope and capabilities of a backup computer system fingerprint lookup (hash) hash database. Prior art solutions typically do not populate fingerprint lookup structure unlike embodiments of the disclosure. In some embodiments, if the hash is not found in the remote database, there is no requirement to send the data in question. Optimization is achieved by performing reads for the suggested range in question to ensure it is present in the hash database.

In some embodiments, embodiments of the present disclosure allow remote copy partnerships to leverage deduplication relationship details for the purpose of optimizing deduplication hit rates through pre-population of deduplication fingerprint databases prior to data transmission.

In some embodiments, embodiments of the present disclosure are more cost effective that merely expanding the size of the deduplication database on a remote site.

BRIEF DESCRIPTION OF THE DRAWINGS

The present disclosure will now be described, by way of example only, with reference to possible embodiments, as illustrated in the following figures:

FIG. 5 depicts a fingerprint lookup structure 416, according to a possible embodiment of the present disclosure;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
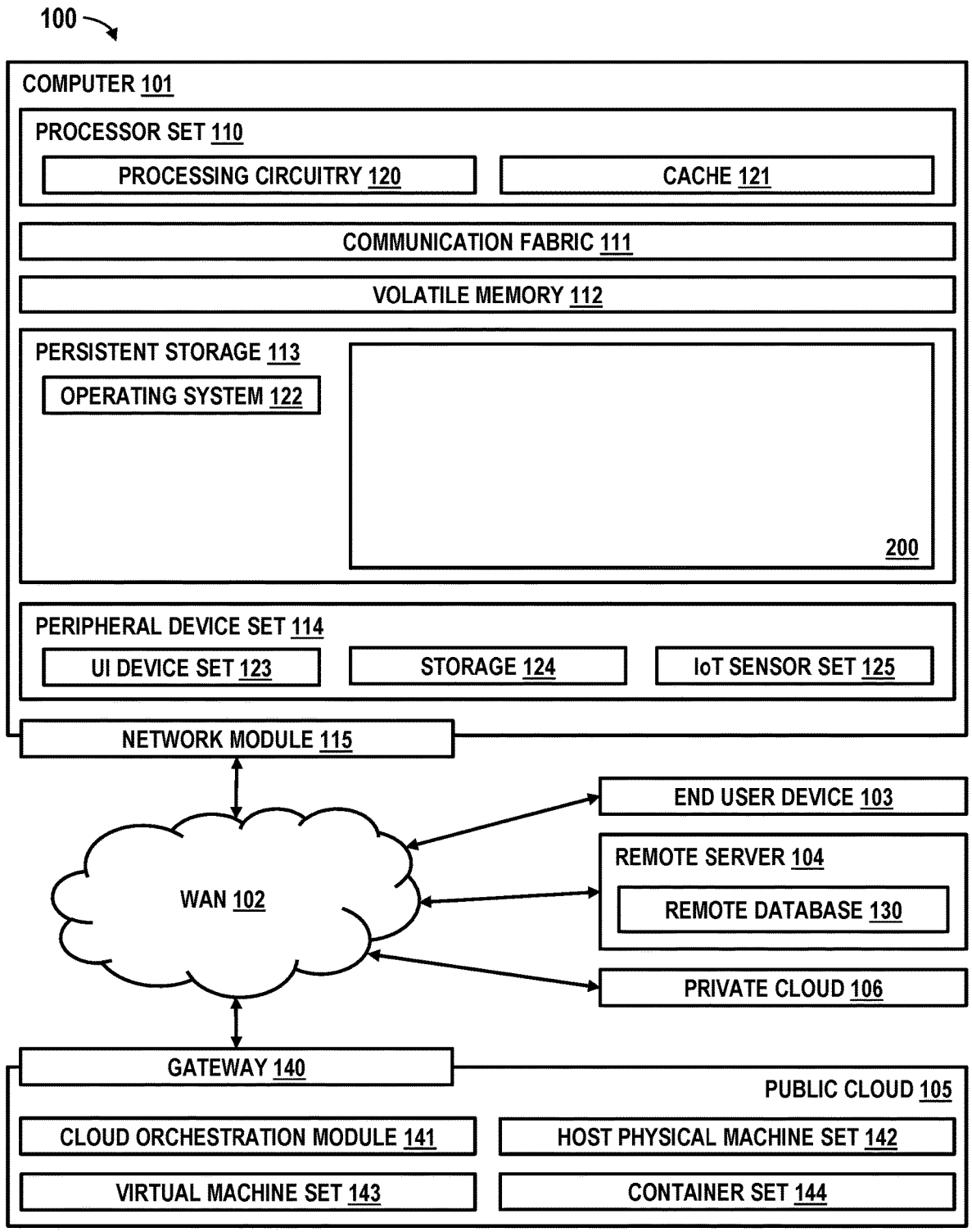
FIG. 1 depicts a computing environment 100, according to an embodiment of the present disclosure.

FIG. 1 depicts a computing environment 100. Computing environment 100 contains an example of an environment for the execution of at least some of the computer code involved in performing the inventive methods, such as software functionality 201 for an improved storage controller 412. In addition to block 201, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 201, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 201 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 201 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard disk, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A logical unit number (LUN) is a unique identifier for identifying a collection of physical or logical storage. A LUN can reference a single disk, a partition of disks, or an entire RAID array. Logical block addressing (LBA) is a method for specifying a location of blocks of data on storage devices.

Small Computer System Interface (SCSI) a set of command set standards for physically connecting and transferring data between computers and peripheral devices, such as disks. SCSI is available in a number of interfaces, for example, SSA, 1 Gbit Fibre Channel (1GFC), SAS. SCSI can be parallel or serial. The skilled person would understand that there are other command sets and interfaces. Another example is NVM Express (NVMe) or Non-Volatile Memory Host Controller Interface Specification (NVMHCIS), which is an interface specification for accessing a computer's non-volatile storage media usually attached via PCI Express (PCIe) bus.

In the storage subsystems of IBM® DS8000® series, IBM Storwize®, and IBM FlashSystem, the SAS protocol is used for the internal disks. The storage subsystems have controllers that provide the required hardware adapters for host connectivity to the subsystem. RAID adapters are used to create a virtual disk or logical unit number (LUN) that is configured in one of the supported RAID levels with multiple SAS hard disks based on the level of RAID used. Various levels of RAID of available to configure internal SAS HDDs or SDDs. IBM, DS8000, Storwize, FlashCopy, and Spectrum Virtualize are trademarks of International Business Machines Corporation, registered in many jurisdictions worldwide.

Embodiments of the present invention apply to advanced copy function technologies, for example, point-in-time copy functions to create snapshot and clone copies, and to deduplication technologies. An example of a point-in-time offering is IBM Flashcopy®.

Embodiments will be described in terms of block storage technology, but are equally applicable to other technologies such as file storage technology.

An LSA is used as a directory that defines the physical placement of data blocks independent of size and logical location. Each logical block device has a range of Logical Block Addresses (LBAs), starting from 0 and ending with the block address that fills the capacity. When written, an LSA enables data to be allocated sequentially, providing a lookup to match the LBA with the physical address within a storage device array.

Forward lookup structures allow efficient lookup based on a unique identifier. In contrast reverse lookup structures allow for efficient lookup to find data based on some related information.

In some architectures, deduplication operates by having an in-memory lookup structure to contain partial hashes of recent writes, as full hash values take up large amounts of memory. A hash database typically contains a fingerprint and the virtual address and storage device associated with it. However, as only a few bytes are needed to be unique, typically only partial hashes are stored to save on memory space. Therefore, the database is also known as a 'fingerprint' database, because the full hash is not contained within.

An incoming Input/Output (I/O) operation first performs a hash calculation, using an algorithm like MD-5, SHA-1 or SHA-256. That hash is then compared against the lookup structure to determine if there may be a match in the system for this I/O. If there is a potential match, the potential match is subject to a lookup to determine if the full hash is located in the storage system. If the full hash is located in the storage system, a reference is created for the virtual address and volume that the I/O operation is trying to write to, referencing the potential match's location.

The size of the in-memory lookup structure, often in the form of a table, is one of the factors determining whether or not a deduplication reference is found. For example, in IBM® Spectrum Virtualize™, a deduplication lookup is limited to the memory available within a cluster, and currently deduplications can only be performed within an I/O group.

A reverse lookup structure also exists, mapping between physical address and the owning virtual address, for the purpose of garbage collection. This is indexable by physical address and is usually a log structured array.

Locally found deduplications on the primary computer system can be leveraged to inform the backup computer system's deduplications.

Given the choice of where to place memory, a powerful primary computer system with more memory would result in more deduplication savings on both sites when compared with splitting memory evenly between the sites, assuming that the secondary is handling similar workloads to the local site.

In a hybrid cloud environment, where hash-acceleration hardware and large memory configurations may not be as available compared to a customer's on-site environment, the remote site would be able to benefit from the findings of deduplication on the local site. If the customer has this hardware, it is a capital sunk-cost, so they might as well get the maximum benefit from it when compared with having to pay for the running of a more powerful cloud instance.

In an enterprise storage system, the same data can often be stored in multiple places. In RAID 1, such duplication is intentional so as to provide data redundancy. However, in some cases, duplication is unintentional leading to inefficient use of physical devices.

In some systems, duplicate data can be removed with a deduplicate operation. In computer science, 'deduplication' is the elimination of duplicate or redundant information. Deduplication comprises deleting duplicate data. Pointers and references also need updating to reference to the remaining data instance. In systems employing a Redundant Array of Independent Disks 'RAID', the identification of duplicate data and the updating of references are especially difficult, because the nature of such systems inherently applies a layer of abstraction to the location of a particular data block.

Conversely, when improved data integrity is desired, there is a need to identify data regions that display a single point of failure.

Structures are used to store metadata that describes where user data is to be found. Such structures are often stored on storage devices, but some are held within memory. In order to track updates, journals can be held to record updates to metadata structures, and to ensure that they remain consistent. An example of a structure is a forward lookup b-tree, but other architectures are possible. Metadata is stored in the data storage system by way of a log structured array (LSA) tree structure operable by fixed mapping, the tree structure comprising respective leaves wherein some leaves are configurable to respectively comprise a predefined range of respective slots with each slot representing a given virtual address in respect of which data is written onto the data storage system in a given host write, the population of a given slot depending on whether a given host write is performed in respect of the virtual address represented by that given slot, and some leaves are allocated to comprise given nodes that are each configurable to point towards a given leaf when accessed.

Full hash values of stored data are saved in the forward lookup structure on persistent storage e.g. for example in a separate volume of the storage system. This forward lookup structure allows access by the virtual address in log(n) time, and is organised to optimise the required number of device accesses, typically with multiple caching. Lookup provides details of the data, such as reference counts, physical address of the data on storage device, a hash value of the data, and any other useful bits of metadata. In addition to these structures, a reverse lookup structure is typical. This provides information about which storage device owns a given chunk of on-device metadata. Typically this is used for operations such as garbage collection.

In practice a forward lookup structure is typically an efficient log structured array (LSA). An LSA is efficient to search within using address search terms, but is not so efficient when using hash value search terms. Therefore, a hash lookup uses a large amount of memory.

If a leaf-node in a b-tree is read in a LSA, there are typically multiple hashes next to each other. >200 duplicates are not unusual. U.S. patent Ser. No. 10/430,285 B2, Hutchinson, G. D. et al ("Backing Up Metadata", 1 Oct. 2019) discloses a mechanism for backing up metadata in a data storage system. This discloses a leaf node representing a contiguous virtual domain range. From that all the hashes that belong in address space 0→25 MB (for example) can be found.

Copy services are a collection of features which allow storage systems to have disaster recovery integrated into the I/O path. This is achieved via Remote Copy features by transmitting data to a partner storage system. The partner storage system will be referred to as the backup computer system. Other terms commonly used are "Remote" and "Secondary". The backup computer system performs the I/O, notifies the Primary system, and the I/O is removed from the pending set.

IBM Remote mirror and copy is a storage feature that constantly updates a target copy of a volume so that it matches changes that were made to its associated source volume. IBM Remote mirror and copy does not capture the state of the source volume at some point in time, but rather reflects all changes that were made on the source volume to the target volume.

IBM Global Mirror provides an asynchronous long-distance copy option where write operations to a storage unit at a Primary (production) system are considered complete before they are transmitted to a storage unit at a backup computer system. IBM Metro Mirror functions provides a synchronous long-distance copy option that constantly updates a secondary copy of a volume to match changes made to a source volume. Writes to the primary computer system are only considered complete when transmitted to a storage unit at your recovery site. IBM Global Mirror uses change volumes that are associated with the primary and secondary volumes. These points in time copies are used to record changes to the remote copy volume, the FlashCopy map that exists between the secondary volume and the change volume, and between the primary volume and the change volume. This function is called Global Mirror with change volumes (cycling mode).

Disaster recovery is integrated into the I/O path through IBM Remote mirror and copy features transmitting data to a partner storage system. The Backup site performs the I/O, notifies the Primary site, and the I/O is removed from the pending set.

Point-in-time copy is a feature supported on various storage devices that allows nearly instantaneous point in-time copies of entire logical volumes or data sets to be made. The point-in-time function allows full volume copies of data to be made, with the copies immediately available for read or write access. The copy may be used with standard Backup tools that are available in a computing environment to create Backup copies on tape.

"Snapshot" provides the ability to record the state of a storage device at any given moment and preserve that snapshot as a guide for restoring the storage device in the event that it fails. A snapshot primarily creates a point-in time copy of the data. Typically, a snapshot copy function is done instantly and made available for use by other applications such as data protection, data analysis and reporting and data replication applications. The original copy of the data continues to be available to the applications without interruption, while the snapshot copy is used to perform other functions on the data. A snapshot is a point-in-time copy that is dependent on the primary disk. A snapshot may, for example, be accomplished using a copy-on-write procedure, in which currently existing data in a region on the primary disk is written to the backup disk when a write is being made to the region on the primary disk. Thus, the backup disk will contain data that has been overwritten on the primary disk, as opposed to a complete copy of the primary disk. This type of backup copy typically results in a thinly provisioned volume, which reduces storage. A series of snapshot copies may be cascaded together to represent the primary disk at various times. However, the snapshot copies typically remain dependent on the primary disk to reassemble a complete copy of the primary disk. Therefore, a snapshot is a point-in-time copy where the target only holds the changed data necessary to present the point-in-time copy of the source. Data is only copied to the target disk if it is changed on the source. The target disk is generally always dependent on some of the data on the source disk in order to present the point-in-time copy.

In contrast, a "clone" is a point-in-time copy that is independent of the primary disk. A clone may, for instance, be created by executing a background copy procedure in which a disk's regions are sequentially copied to the Backup disk and executing a copy-on-write procedure to immediately copy any primary disk regions that are about to be overwritten due to a write and have not yet been processed by the background copy procedure. A clone is typically used when a copy is needed and input/output (I/O) to the copy must not impact I/O to the primary volume in any way. A clone may also be used when the copy is not to be affected by availability to the source. A clone may also be used in a cascade. Therefore, a clone is a point-in-time copy where the target disk will hold a complete copy of the data that was on the source disk when the point-in-time copy was started. When the copying of the data from source to target completes, the target disk is independent of the source.

\\\\\\\\\\\\\\\\\\\\\\\\\-Point-in-time copies are made using a bitmap to keep track of data grains copied over from a source disk to a target disk. When data is copied between a source and a target, the data is copied in chunks known as "grains." Grain size is determined at the time of mapping creation. Typical sizes are 256 KB and 64 KB. Data grains are copied using a background copy process. In the event of a read of a data grain to the target drive before the data grain has been copied over the target, the read is redirected to the source drive. In the event of a read of a data grain to the target drive after the data grain has been copied over the target, the read is directed to the target drive. In the event of a write of a data grain to the target drive before the data grain has been copied over the target, the corresponding entry in the bitmap is marked as complete. In the event of a write of a data grain to the target drive after the data grain has been copied over the target, the write is directed to the target drive. In the event of a write of a data grain to the source drive before the data grain has been copied over the target, the data grain is first copied to the target drive before the source disk data grain is overwritten with new data. In this way the source and target drives are presented to the host as being instantaneously available, even before all data has actually been copied over to the target drive.

Backup computer systems need not have the same computing resources as the primary computer system. For example, the memory available on the backup computer system may be less than on the primary computer system. Although deduplication services may also be available on the backup computer system, deduplication capabilities may be less than on the primary computer system due to the available memory.

Therefore, there is a need in the art to address the aforementioned problem.

Embodiments of the disclosure describes a way to use deduplication between replicated systems. A known method is to send hashes or partial hashes instead of the data to see if the data is already present on the remote system either 1) at a volume destination, in which case there is no need to send the data, or 2) in the same deduplication volume, in which case a reference can be created on the remote system. In contrast, embodiments of the present disclosure consist in telling the remote system directly where to look for the potential deduplication. This means that there is a guarantee that the backup computer system would deduplicate at least as well as the primary computer system, because the primary computer system will tell the backup computer system where to look for the data, and in addition the secondary will still be able to deduplicate normally the data it is seeing. So in the cases where resources (e.g. memory) are limiting the deduplication ration, embodiments of the present disclosure help, even more when the remote system is less powerful than the production system.

Figure 2:
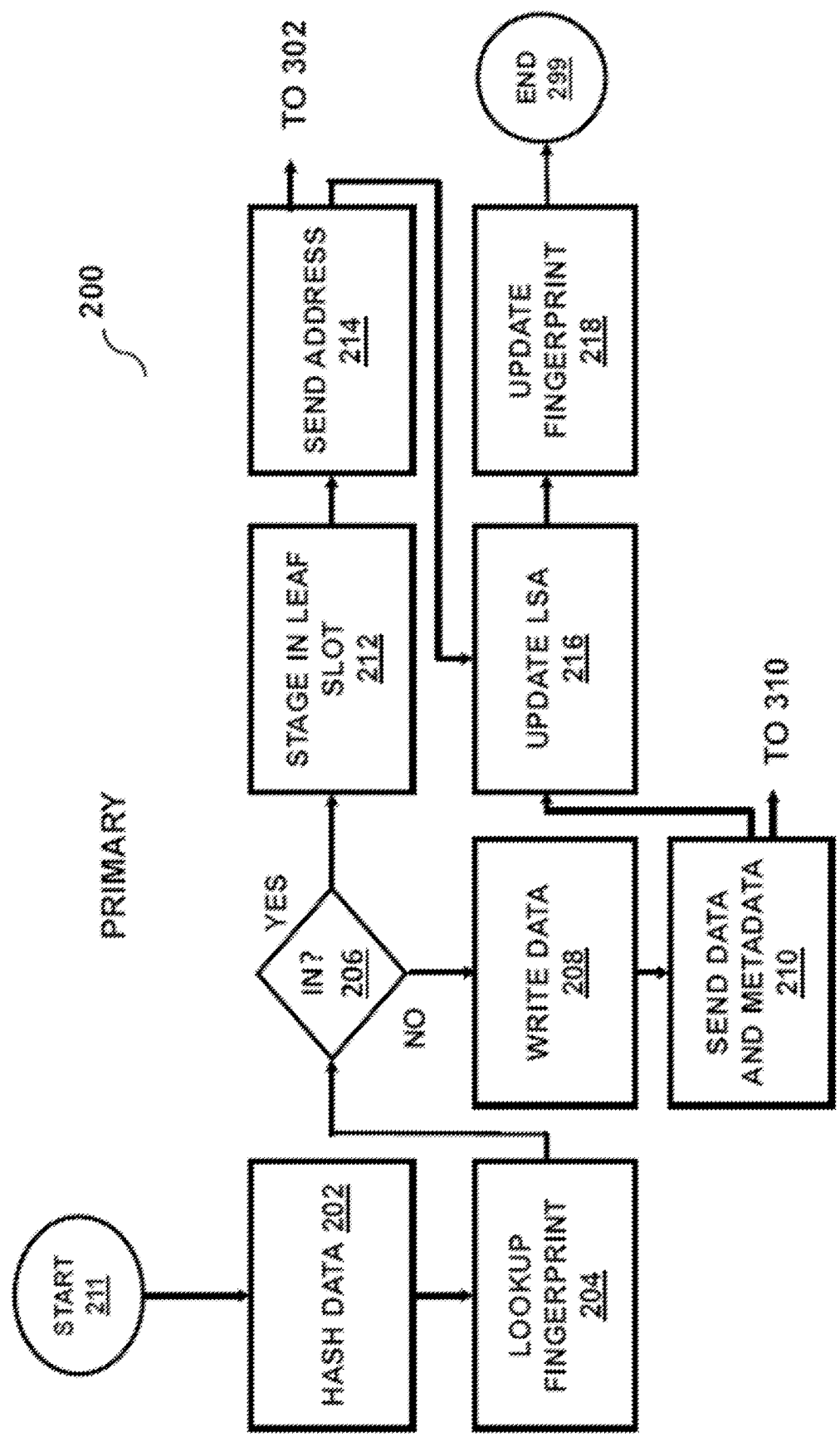
FIG. 2 depicts a high-level exemplary schematic flow diagram 200 depicting operation methods steps for writing data to a storage array, according to a possible embodiment of the present disclosure.

FIG. 2, which should be read in conjunction with FIGS. 3 to 8, depicts a high-level exemplary schematic flow diagram 200 depicting operation methods steps for writing data to a storage array, according to a possible embodiment of the present disclosure.

Figure 3:
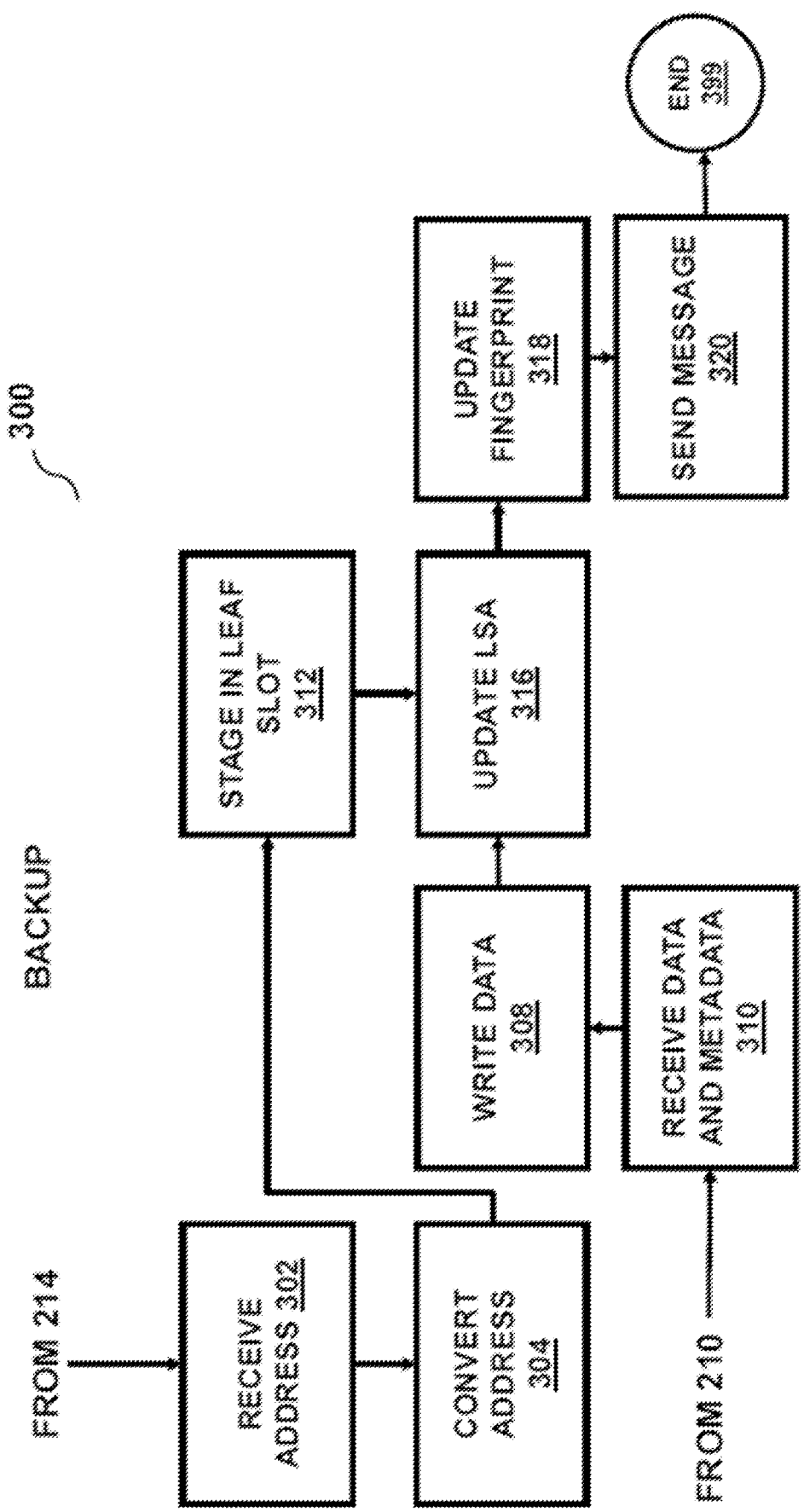
FIG. 3 depicts an exemplary schematic flow diagram 300 depicting operation methods steps for writing data to a backup storage array, according to a possible embodiment of the present disclosure.

FIG. 3 depicts an exemplary schematic flow diagram 300 depicting operation methods steps for writing data to a backup storage array, according to a possible embodiment of the present disclosure.

Figure 4:
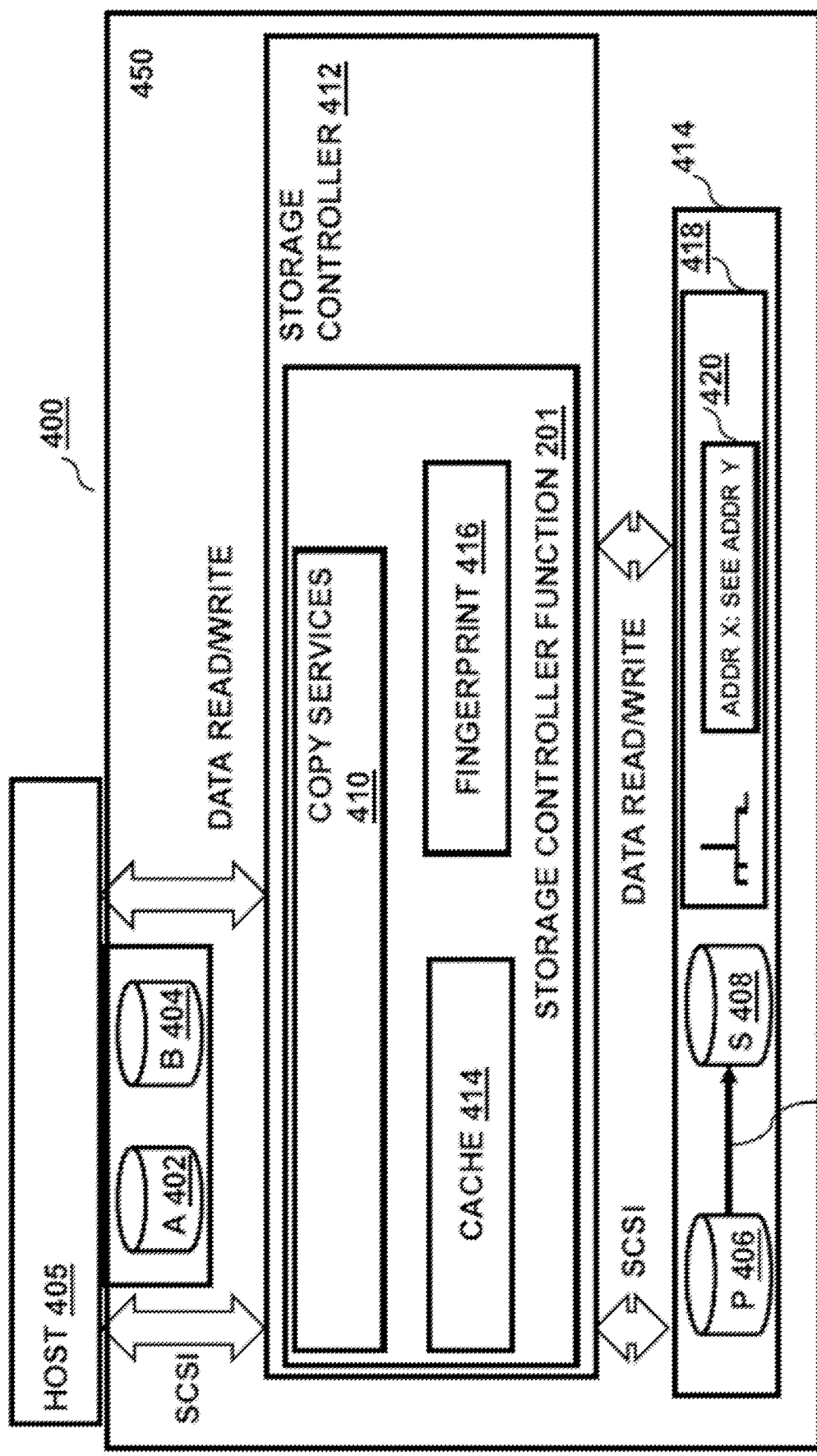
FIG. 4 depicts a high-level exemplary schematic diagram depicting a primary computer system 400, according to a possible embodiment of the present disclosure.

FIG. 4 depicts a high-level exemplary schematic diagram depicting a primary computer system 400, according to a possible embodiment of the present disclosure. FIG. 4 depicts a host 405, and a storage system 450. The storage system 450 comprises a storage controller 412, and a storage drive disk enclosure 414. The storage controller 412 also comprises a stack of components, for example a copy services component 410, a cache component 414, and a fingerprint lookup structure 416. The enclosure 414 comprises two storage devices 406, 408, and a forward lookup structure 418. Commands are passed between the host 405, storage controller 412 and drive enclosure 414 using SCSI commands. If a cache 414 is available, data is written to the cache 414 and destaged to the devices according to a cache algorithm. For reads, data is first read from the cache 414, and only if not present (known as a cache miss), the data is read from the devices. Data is read and written across the depicted interfaces. For the purposes of illustration of the present disclosure, reads and writes to storage devices 406, 408 are considered a being equivalent to reads and writes to the corresponding cache layers as well. Also depicted is a deduplication relationship 426 between drive P 406, and drive S 408. Reads to a first address X on P 406 are in effect redirected to a second address Y on S 408, because the forward lookup structure 418 signifies 420 that data at the first address X is a duplicate of data at the second address Y. Underlying storage devices are presented to the host 405 as logical storage volumes A 402, and B 404 in a storage pool, because, for example, the actual underlying storage devices in the storage enclosure 414 may be in reality devices of a RAID array.

The primary computer system 400 is in a copy relationship with a backup computer system (not depicted). The backup computer system comprises similar components to the primary computer system 400. However, the backup computer system may comprise less memory in its storage controller function, leading to a smaller footprint fingerprint lookup structure. For clarification, like for like components will be designated by a suffix of B, for example the send/receive component of the backup computer system 400B is designated as send/receive component 810B.

Arrows depicted in the figures represent SCSI command and also read/write data paths.

FIG. 5 depicts a fingerprint lookup structure 416, according to a possible embodiment of the present disclosure. FIG. 5 depicts one embodiment of a fingerprint lookup structure 416. The fingerprint lookup structure 416 stores the partial hash 510, volume, virtual address, and slot index. For example, hash value ABCD012352930898dc96f3aac7cbc54fd6530590x has a partial hash of ABCD0123x. The fingerprint lookup structure 416 may also comprises other parameters, such as a reference count of duplicate entries.

Figure 6:
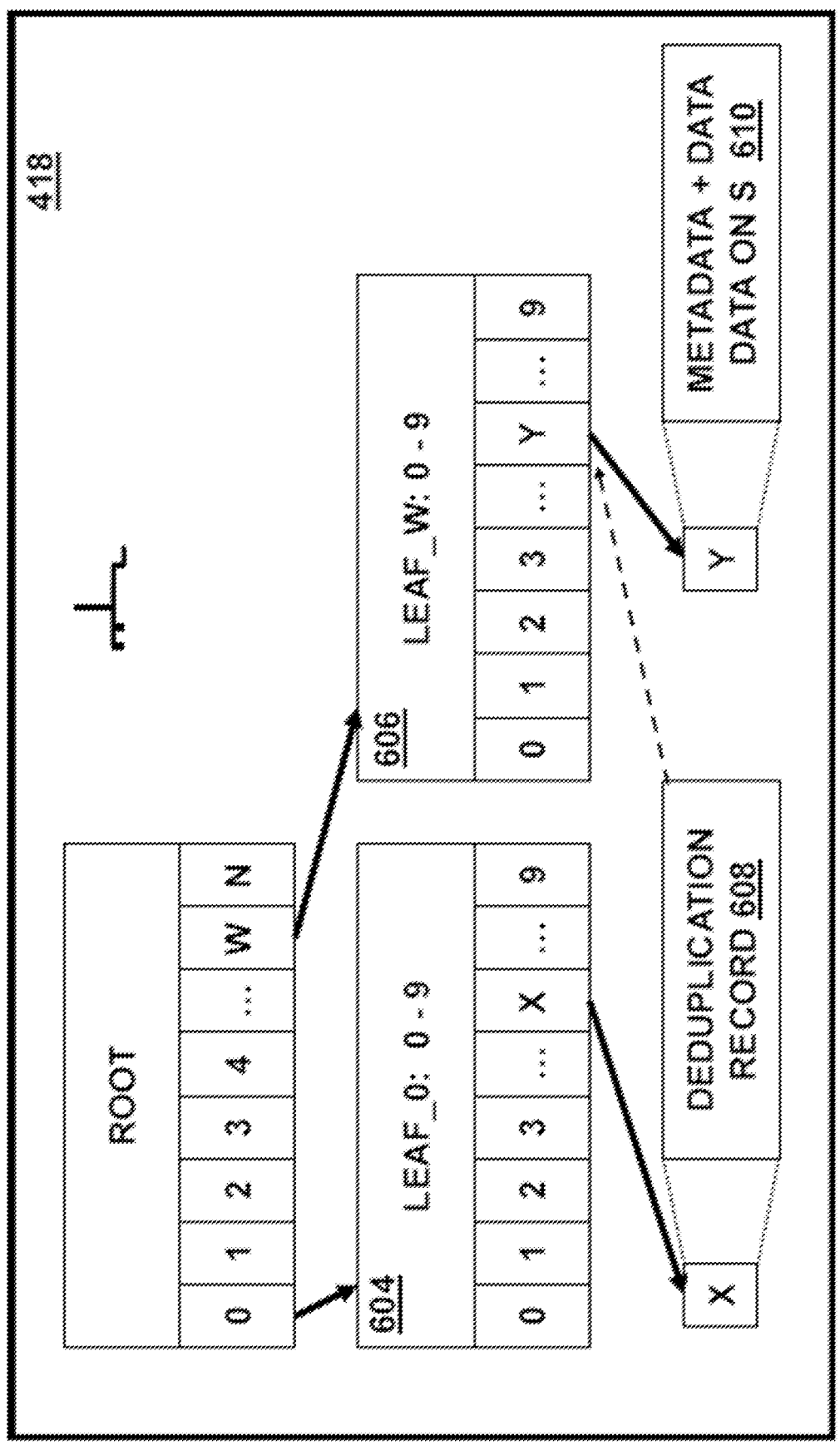
FIG. 6 depicts a forward lookup structure 418, according to a possible embodiment of the present disclosure.

FIG. 6 depicts a forward lookup structure 418, according to a possible embodiment of the present disclosure. FIG. 6 depicts the forward lookup structure 418 implemented as tree structure. The contents of slot X comprises a deduplication record 608 one embodiment of a fingerprint lookup structure 416.

A forward lookup structure 418, 418B is typically an efficient-access lookup structure. One example is a b-tree, but other configurations are possible. The forward lookup structure 418, 418B is typically a log structured array (LSA), searches of which are efficient if based on address, but not typically if based by hash. Therefore, a fingerprint hash lookup uses a large amount of memory.

If a leaf-node is read on a log structured array, there are typically multiple hashes next to each other. For example, a leaf node can represent a contiguous virtual domain range. From that all the hashes that belong in address space 0→25 MB (for example) can be found.

Figure 7:
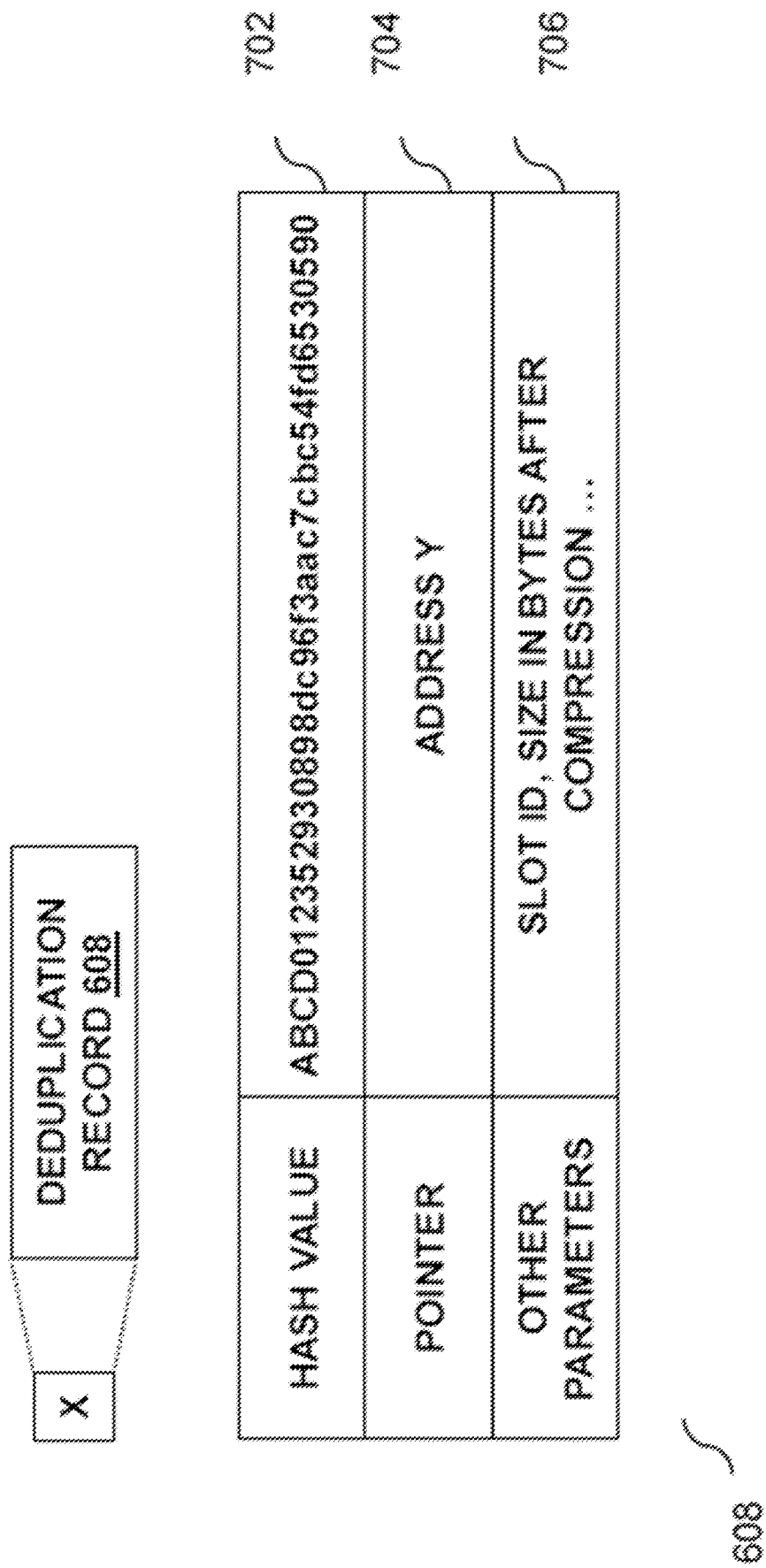
FIG. 7 depicts a deduplication record 608, according to a possible embodiment of the present disclosure.

FIG. 7 depicts a deduplication record 608, according to a possible embodiment of the present disclosure. The deduplication record 608 comprises the full hash value ABCD012352930898dc96f3aac7cbc54fd6530590x, a pointer field to address Y, and other parameters.

Figure 8:
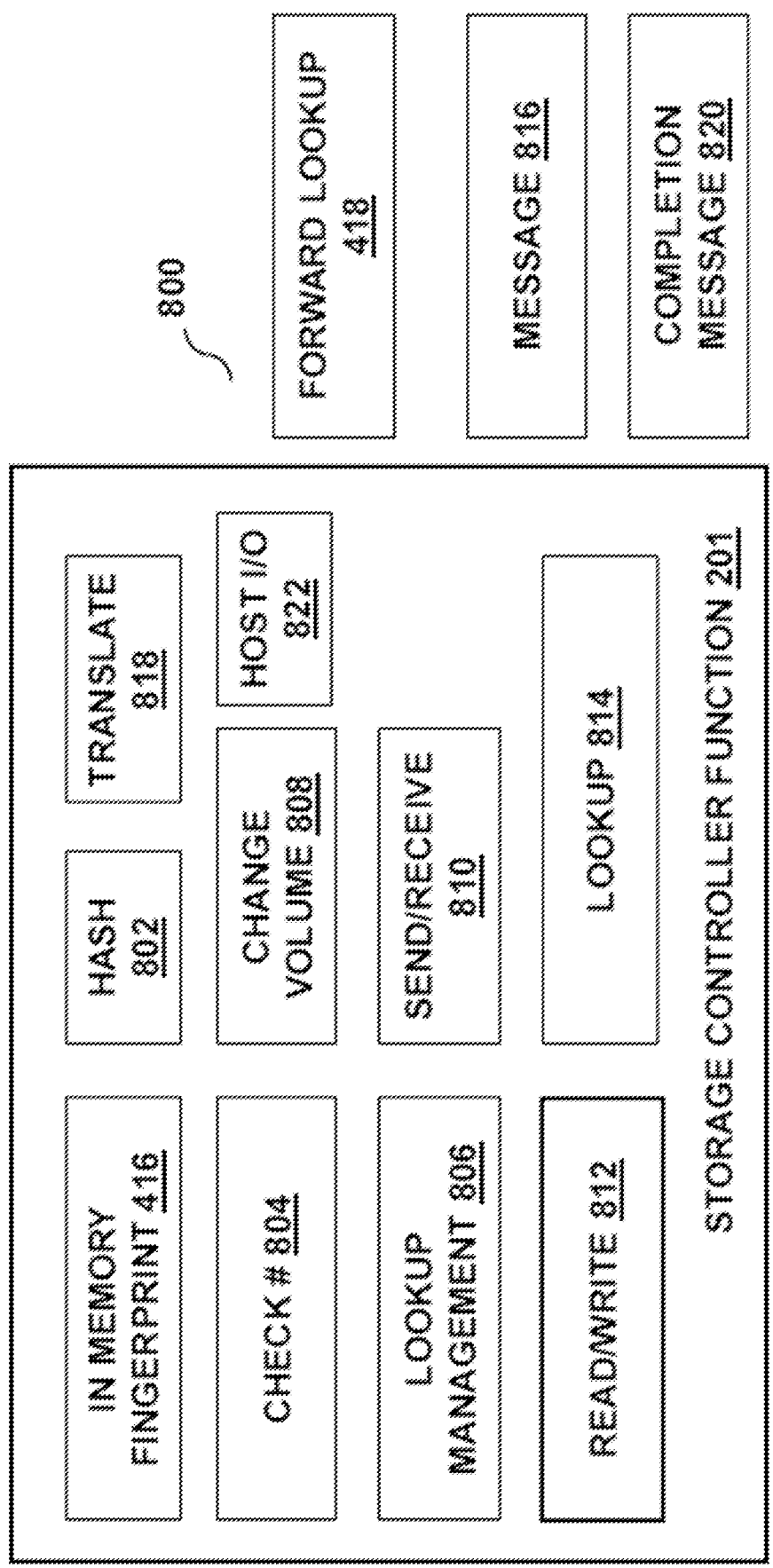
FIG. 8 depicts an exemplary schematic diagram 800 of software elements, according to a possible embodiment of the present disclosure.

FIG. 8 depicts an exemplary schematic diagram 800 of software elements, according to a possible embodiment of the present disclosure.

A method depicts a write of a data block comprising data D to virtual address L of logical storage volume A 402.

The method 200 depicts the write of the data block comprising data D to virtual address L of logical storage volume A 402 in the primary computer system 400. The method 200 starts at step 21511.

At step 202 a hash calculation component 802 calculates a hash value ($H_W$) ABCD012352930898dc96f3aac7cbc54fd6530590x of data D.

At step 204 a lookup component 814 searches for a partial hash value ($H_{W-P}$) of ABCD0123x to identify whether data D has already been stored in the storage system. Storing full hashes in memory of the storage controller 412 is memory intensive, so instead partial hashes are stored. In some instance, only a subset of the hash bit values are sufficient to identify data, hash checking be saved for later. The lookup for the fingerprint lookup structure 416 is indexable by hash, searchable in o(1) time for most fingerprints.

At step 206, the lookup component 814 determines if data D is already stored in the storage system 450.

If data D is already stored in the storage system 450, by finding a match to the partial hash ABCD0123 in an entry 510, the lookup component 814 determines information about the volume, virtual address and slot index that relates to data D. For example, the entry for data D identifies a virtual address of X. If an entry already exists, the tree-node-entry in the forward lookup structure 418 that contains the current reference on device is pointed at. The fingerprint lookup structure 416 comprises a virtual address rather than a physical address, so that if data is relocated on a device (e.g. via garbage collection) only one location needs updating rather than having to update multiple back-references.

At step 212, a check component 804 looks up the virtual address X identified in step 206 in the forward lookup structure 418. The check component 804 stages in metadata 608 found at a virtual address X in leaf_0 604 of the forward lookup structure 418. The metadata 608 comprises a deduplication record 608 that points at physical address Y in leaf_W 606. The deduplication record 608 comprises the full hash 702, a pointer to the physical address Y 704, slot id, and size in bytes after compression 706. Metadata 610 for physical address Y signifies that data D is found on device S 610. A read/write component 812 reads data from the device S 610. The hash component 802 calculates a hash value ($H_R$) of the read data. The check component 804 compares the hash value ($H_R$) of the read data to the hash value ($H_W$) from data D to confirm that data D is indeed already stored in the storage system 450. The lookup for the leaves/forward lookup structures is searchable by virtual address in log(n) time.

At step 214, a send/receive component 810 sends a message 816 to a backup storage system 450B. The message 816 comprises the results of the lookup make in step 212, for example virtual address X and physical address Y.

At step 216, a lookup management component 806 updates the forward lookup structure 418 to reflect the new write of data D to virtual address L. For example, if data D is already stored in the storage system 450 the update comprises adding pointer information to virtual address X in a leaf slot, and the hash value ($H_W$). If a deduplication reference is added to a tree, the non-owning reference at the owner leaf (here virtual address X), rather than directly pointing at the physical address Y. Whilst this requires an additional hop in order to read the data, it means that multiple virtual addresses associated with the data need not be stored and updated, for example following garbage collection.

At step 218 the fingerprint lookup structure 416 is updated to reflect that a write of data D to virtual address L has been made. A fingerprint lookup structure 416, 416B often uses something similar to an LRU (least recently used) cache. A reference count (not shown) against the hash entry 510 is be updated. The entry is also updated so that it's less likely to be removed by the LRU algorithm.

In a synchronous remote copy system, in response to the first hash value ($H_W$) being equal with the second hash value ($H_R$), successful update to the forward lookup structure 416, successful update to the fingerprint lookup structure 418, and completion message 820 received back from the backup computer system 400B, a successful write I/O operation at the primary computer system 400 can be reported to the host 405. The method ends at step 299.

Returning to step 206, if data D is not already stored in the storage system 450, at step 208, the read/write component writes data D to address L.

At step 210, the send/receive component 810 sends data D to the backup system, along with associated metadata.

At step 216 in this case, a lookup management component 806 updates the forward lookup structure 418 to reflect the new write of data D to virtual address L.

At step 218 in this case, the fingerprint lookup structure 416 is updated to reflect that a write of data D to virtual address L has been made. For example, a new entry in the fingerprint structure 416 to reflect the new hash value ($H_W$).

In a synchronous remote copy system in this case, in response to successful writing of data D, successful update to the forward lookup structure 416, successful update to the fingerprint lookup structure 418, and completion message 820 received back from the backup computer system 400B, a successful write I/O operation at the primary computer system 400 can be reported to the host 405 by a host I/O component 822. The method ends at step 299.

Turning to the backup computer system 400B the method 300 depicts the write of the data block comprising data D to virtual address L of logical storage volume A 402 in the backup computer system 400B.

Following step 214, at step 302, a send/receive component 810B of the backup computer system 400B receives the message 816 comprising the addresses X and Y.

At step 304, a translate component 818B translates the addresses L, X and Y into equivalent addresses L', X', Y' on the backup computer system 400B.

At step 312, a check component 804B of the backup computer system 400B looks up the virtual address X' sent from the primary computer system 400. The check component 804B stages in metadata 608B found at a virtual address X' in leaf_0 604B of a forward lookup structure 418B. The metadata 608B comprises a deduplication record 608B that points at physical address Y' in leaf_W 606B. Metadata 610B for physical address Y' signifies that data D is found on device S' 610B. A read/write component 812B reads data from the device S' 610B. A hash component 802B calculates a hash value ($H_R$) of the read data.

In some embodiments, the present disclosure allow for the backup computer system 400B to have foresight over the relevant addresses in order to update its fingerprint lookup structure 416B and its forward lookup structure 418B. Receiving addresses ahead of any data, or data hashes allows for the data on the backup compute system 400B to be prefetched from the storage devices ready for validation. Alternatively, as the data is a deduplication, the lookup structures can be updated without validation, taking parameter values from owner leaf nodes.

In some instances, data D is sent, a hash value ($H_C$) of D can be calculated, or primary calculated hash value ($H_W$) can be sent as well. The check component 804B compares the hash value ($H_R$) of the read data to the hash value ($H_W/H_C$) from data D to confirm that data D is indeed already stored in the storage system 450B. By sending the addresses X and Y, no lookup in a fingerprint lookup structure 416B of the backup computer system 400B is necessary.

In an alternative embodiment, a locking mechanism can you used: for example if the write I/O is against an active/passive copy relationship, the backup computer system 400B is not going to have any updates against it from the backup computer system 400B.

At step 316, a lookup management component 806B updates the forward lookup structure 418B to reflect the new write of data D to virtual address L'. For example, if data D is already stored in the storage system 450B the update comprises adding pointer information to virtual address X' in a leaf slot, and the hash value ($H_W/H_C$) if available.

At step 318 the fingerprint lookup structure 416B is updated to reflect that a write of data D to virtual address L' has been made.

In response to a successful update to the forward lookup structure 416B, a successful update to the fingerprint lookup structure 418B, at step 320, the send/receive component 810B sends the completion message 820 back to the primary computer system 400 to indicate that updates have been made. If the hash value ($H_W/H_C$) if available, successful validation of the first hash value ($H_W$) being equal with the second hash value ($H_R$) is also required. The method ends at step 399.

Returning to the option where data D was not already stored in the primary computer system 400, at step 310 the send/receive component 810B of the backup computer system 400B receives the data D and metadata from the primary computer system 400.

At step 308, in this case, the read/write component 812B writes data D to an address L' as indicated in the received metadata, address L' corresponding to address L in the primary computer system 400.

At step 316, in this case, the lookup management component 806B updates the forward lookup structure 418B to reflect the new write of data D to virtual address L'.

At step 318, in this case, the fingerprint lookup structure 416B is updated to reflect that a write of data D to virtual address L' has been made. For example, a new entry in the fingerprint structure 416B to reflect the new hash value.

In a synchronous remote copy system, in response to the first hash value ($H_W$) being equal with the second hash value ($H_R$), successful update to the forward lookup structure 416, successful update to the fingerprint lookup structure 418, and completion message 820 received back from the backup computer system 400B, a successful write I/O operation at the primary computer system 400 can be reported to the host 405. The method ends at step 299.

In response to a successful update to the forward lookup structure 416B, a successful update to the fingerprint lookup structure 418B, at step 320 in this case, the send/receive component 810B sends the completion message 820 back to the primary computer system 400 to indicate that updates have been made The method ends at step 399.

At step 320, the send/receive component 810B sends the completion message 820 back to the primary computer system 400 to indicate that updates have been made. The method ends at step 299.

In an alternative embodiment, in the case of asynchronous replication, the disclosure can build up a view of which local volumes most strongly correlate to a given transmission. The backup computer system 400B can then be informed of these ranges and volumes prior to transmitting the data associated with the remote copy delta. This will in turn result in improved deduplication hit-rates on the remote system.

If a local primary computer system 400 is synchronising a volume—or sending data to a backup computer system 400B, knowledge of what volumes deduplicate locally are already known. If these referred volumes are synchronized on a remote copy link, the backup computer system 400B may be informed that it is worth performing hash-database population actions (i.e. reading specified ranges of the synced referred copies) prior to transmitting the data.

On the primary computer system 400, a set of remote copy partnership volumes having deduplication references to a secondary, synchronized volume is determined.

Prior to sending the data from a change volume 808 to the backup computer system 400B, messages 816 are sent to notify the backup computer system 400B with information about which ranges of the secondary, referenced volume are applicable. The forward lookup structure 418 is updated, but in addition the fingerprint lookup structure 416B is prepopulated, so that when any necessary data arrives the entries are available in the fingerprint lookup structure 416B. Alternatively, if the referenced volumes are unlikely to change (e.g. something similar to safeguarded copies), an I/O lock could be created to prevent their modification, and the direct addresses of the data on the backup computer system 400B could be sent instead of the data itself. This would have the benefit of avoiding sending the data itself.

The approach lends itself well to asynchronous remote copy behavior as in these cases ranges of relationships can be coalesced to further optimize transmission.

In some embodiments, in cases where bandwidth is optimized by sending hashes associated with a deduplication database to a backup computer system 400B system to save bandwidth on transmission, the fingerprint lookup structure 416B can be pre-populated prior to beginning an asynchronous transfer with a set of entries, or a refresh of entries.

In an asynchronous remote copy system, once the fingerprint lookup structure 416 has been updated 218, 318, the method ends at step 299, 399.

In an alternative embodiment, data D' is written to an address X" that already contains data that has deduplication records pointing at it. Overwriting would necessitate broken pointers from the deduplication record. Therefore, to avoid this situation, the virtual domain has multiple slots per grain. If there are live references to a deduplicated chunk, one of the other slots associated with the grain are used to overwrite data. If there are no further free slots, the data is not allowed to be deduplicated against, as secondary references would not be able to be maintained.

In an alternative embodiment, other results from lookups are sent to the backup computer system 400B. Examples include results from the fingerprint lookup of step 204. In some embodiments, any lookup results made on the primary computer system 400 are of benefit to the backup computer system 400B.

In an alternative embodiment, a primary computer system 400 only comprises a single lookup structure 416, 418. Address results from looking up partial or full hash values are sent to the backup computer system 400B to avoid costly lookups.

The skilled person would understand that although the fingerprint lookup structure 416 has been described as a table, and the forward lookup structure 418 as a tree-structure, other architectures of lookup structures 416, 418 are possible.

In an alternative embodiment, instead of checking the forward lookup structure 48, 418B in order to find the full hash, on-device data could be staged in, and hash values calculated to identify appropriate addresses.

In an alternative embodiment, data is stored on the storage device in a RAID array, and/or in compressed form.

In an alternative embodiment, a different interface is used, for example NVMe.

In an alternative embodiment, the hashing method of the embodiments are replaced by an alternative cryptographic method.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above disclosure may be practiced with steps in a different order, and/or with hardware elements in configurations that are different than those which are disclosed. Therefore, although the application has been described based upon these possible embodiments, it would be apparent to those of skill in the art that certain modifications, variations, and alternative constructions would be apparent.

While possible embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "illustrative" is used herein to mean "serving as an example, instance or illustration." Any embodiment or design described herein is intended to be "illustrative" and is not necessarily to be construed as possible or advantageous over other embodiments or designs.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

For the avoidance of doubt, the term "comprising", as used herein throughout the description and claims is not to be construed as meaning "consisting only of".

The invention claimed is:

1. A computer implemented method for managing a storage system, the storage system comprising a primary system and a backup system, wherein the backup system is in a copy relationship with the primary system, the method comprising:

in response to a write input/output (I/O) operation, the write I/O operation comprising a deduplication and writing of first data:

at the primary system:

calculating a first cryptographic value for the first data;

scanning a first directory to identify an entry corresponding to the first cryptographic value to determine a first set of addresses associated with the deduplication;

transmitting the first set of addresses to the backup system; and updating the first directory with a first entry for the deduplication, the first entry comprising a pointer to the first set of addresses;

at the backup system:
  updating a second directory with a second entry for the deduplication, the second entry comprising a pointer to a second set of addresses corresponding to the first set of addresses;
  reading specified ranges of synced referred copies; and
  performing the deduplication.

2. The computer implemented method of claim 1, wherein scanning the first directory to identify the entry corresponding to the cryptographic value to determine the first set of addresses associated with the deduplication operation comprises:
  scanning a first fingerprint lookup structure to identify the cryptographic value for the data to determine a first virtual address of the first set of addresses; and
  identifying the second entry for the first virtual address in a first forward lookup structure, the second entry identifying a first physical address of the first set of addresses, wherein the first physical address comprises the first data;
  wherein updating the first directory comprises updating the first forward lookup structure with the first entry and updating the first fingerprint lookup structure; and
  wherein updating the second directory comprises updating a second forward lookup structure with the second entry and updating a second fingerprint lookup structure.

3. The computer implemented method of claim 2, wherein scanning the first fingerprint lookup structure to identify the first cryptographic value comprises scanning the first fingerprint lookup structure to identify a partial cryptographic value of the first cryptographic value.

4. The computer implemented method of claim 1, wherein the first cryptographic value is a hash value.

5. The computer implemented method of claim 1, wherein further comprises:
  at the primary system:
    reading second data from a first physical address of the first set of addresses;
    calculating a second cryptographic value for the second data; and
    in response to the first cryptographic value being equal with the second cryptographic value, signaling a successful deduplication at the primary system.

6. The computer implemented method of claim 5, further comprising:
  at the backup system:
    reading third data from a second physical address of the second set of addresses;
    calculating a third cryptographic value for the third data; and
    in response to the first cryptographic value being equal with the third cryptographic value, signaling a successful deduplication to the primary system.

7. The computer implemented method of claim 1, further comprising translating the first set of addresses into the second set of addresses.

8. The computer implemented method of claim 7, wherein the deduplication operation further comprises a second virtual address, and updating the first directory with the first entry comprises updating the first directory at a location corresponding to the second virtual address.

9. The computer implemented method of claim 7, wherein updating the first fingerprint lookup structure comprises updating a reference count for the cryptographic value.

10. The computer implemented method of claim 1 wherein the first entry and the second entry comprises deduplication entries.

11. The computer implemented method of claim 1, wherein the copy relationship is a synchronous copy relationship.

12. The computer implemented method of claim 1, wherein the copy relationship is an asynchronous copy relationship.

13. The computer implemented method of claim 12, further comprising:
  preparing a change volume associated with a set of deduplication to the primary system;
  determining a first set of volumes in the primary system having deduplication references to a second set of volumes in the backup system;
  prior to sending the change volume associated with the set of deduplication, sending a further set of addresses associated with the second set of volumes to the backup system; and
  at the backup system, updating the second forward lookup structure with a set of second entries associated with the further set of addresses, and prepopulating the second fingerprint lookup structure with a set of third entries.

14. A system for managing a storage system, the storage system comprising a primary system and a backup system, wherein the backup system is in a copy relationship with the primary system, the system comprising:
  responsive to a deduplication, the write input/output (I/O) operation comprising a deduplication and writing of first data:
  at the primary system:
    a first cryptographic component for calculating a first cryptographic value for the first data;
    a lookup component for scanning a first directory to identify an entry corresponding to the first cryptographic value to determine a first set of addresses associated with the deduplication;
    a first send/receive component for transmitting the first set of addresses to the backup system; and
    a first lookup management component for updating the first directory with a first entry for the deduplication, the first entry comprising a pointer to the first set of addresses;
  at the backup system:
    a second lookup management component for updating a second directory with a second entry for the deduplication, the second entry comprising a pointer to a second set of addresses corresponding to the first set of addresses; and
    a check component to read specified ranges of synced referred copies; and
    a change volume to perform the deduplication.

15. The system of claim 14, wherein the lookup component is further operable for:
  scanning a first fingerprint lookup structure to identify the first cryptographic value for the data to determine a first virtual address of the first set of addresses; and
  identifying the second entry for the first virtual address in a first forward lookup structure, the second entry identifying a first physical address of the first set of addresses, wherein the first physical address comprises the first data;
  wherein the first lookup management component is further operable for updating the first forward lookup structure with the first entry and updating the first fingerprint lookup structure; and wherein the second lookup management component is further operable for updating a second forward lookup structure with the second entry and updating a second fingerprint lookup structure.

16. The system of claim 15, wherein the lookup component is further operable for scanning the first fingerprint lookup structure to identify a partial cryptographic value of the first cryptographic value, and wherein the system further comprises:

a first read/write component for reading second data from the first physical address of the first set of addresses;

the first cryptographic component further operable for calculating a second cryptographic value for the second data; and responsive to the first cryptographic value being equal with the second cryptographic value, a host I/O component for signaling a successful deduplication at the primary system.

17. The system of claim 16, further comprising:

a second read/write component for reading third data from a second physical address of the second set of addresses;

a second cryptographic component for calculating a third cryptographic value for the third data; and in response to the first cryptographic value being equal with the third cryptographic value, a second send/receive component for signaling a successful deduplication to the primary system.

18. The system of claim 17, further comprising a translate component for translating the first set of addresses into the second set of addresses.

19. The system of claim 17, wherein the deduplication further comprises a second virtual address, and the first lookup management component is further operable for updating the first directory with the first entry comprises updating the first directory at a location corresponding to the second virtual address, and wherein the first lookup management component is further operable for updating the first fingerprint lookup structure with a reference count for the first cryptographic value.

20. A computer program product for managing a storage system, the storage system comprising a primary system and a backup system, wherein the backup system is in a copy relationship with the primary system, the computer program product comprising: a computer readable storage medium readable by a processing circuit and storing instructions for execution by the processing circuit for performing a method comprising:

in response to a write input/output (I/O) operation, the write I/O operation comprising a deduplication and writing of first data:

at the primary system:

calculating a first cryptographic value for the first data;

scanning a first directory to identify an entry corresponding to the first cryptographic value to determine a first set of addresses associated with the deduplication;

transmitting the first set of addresses to the backup system; and updating the first directory with a first entry for the deduplication, the first entry comprising a pointer to the first set of addresses;

at the backup system:

updating a second directory with a second entry for the deduplication, the second entry comprising a pointer to a second set of addresses corresponding to the first set of addresses, and reading specified ranges of synced referred copies; and performing the deduplication.

\* \* \* \* \*